UNITED STATES PATENT OFFICE.

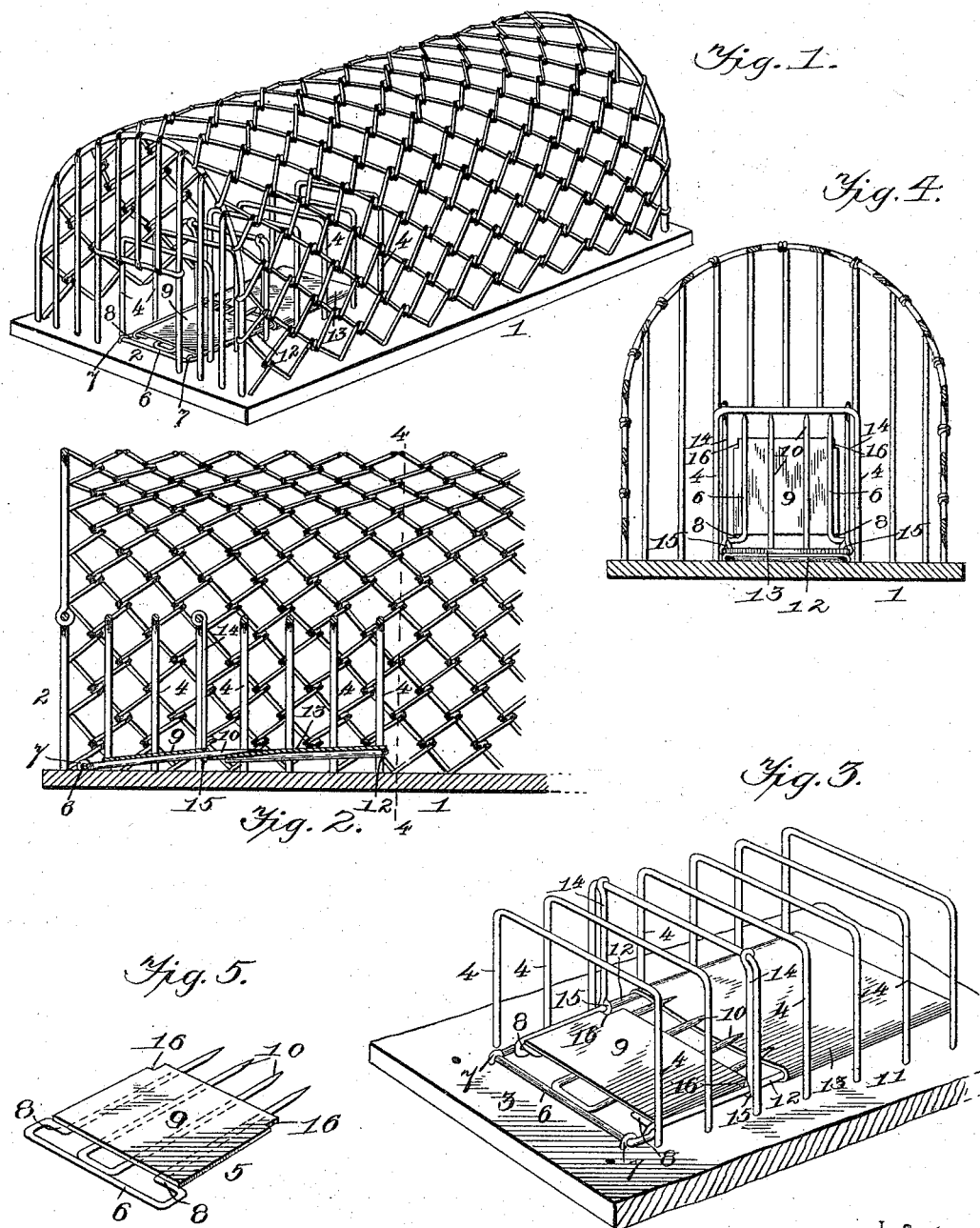

LLOYD FRANKLIN WILLIAMS, OF CLARKSVILLE, TEXAS.

TRAP.

SPECIFICATION forming part of Letters Patent No. 575,450, dated January 19, 1897.

Application filed June 26, 1896. Serial No. 597,043. (No model.)

*To all whom it may concern:*

Be it known that I, LLOYD FRANKLIN WILLIAMS, a citizen of the United States, residing at Clarksville, in the county of Red River and State of Texas, have invented a new and useful Trap, of which the following is a specification.

This invention relates to improvements in self-setting traps, and more particularly to the doors thereof and the means for operating the same.

The object of the invention is to provide in a trap of the character mentioned simple and efficient means for closing the entrance thereof, whereby an animal or fowl passing therethrough shall be prevented returning, and thus be held in the trap, and, further, to so construct such means as to permit the door of the trap remaining in an open position except when the animal or fowl attempts to pass out through the same, thereby affording a free passage to the interior of the trap and presenting an inducement for other animals or fowls to enter.

With these objects in view the invention consists, substantially, in the construction, combination, and arrangement of parts, as will be hereinafter fully illustrated, described, and claimed.

In the accompanying drawings, Figure 1 is a perspective view of a trap having the herein-described improvements applied thereto. Fig. 2 is a longitudinal sectional view thereof with the door open. Fig. 3 is an enlarged detail perspective view of the entrance-passage, the door of the same, and the means for operating the door. Fig. 4 is a transverse sectional view on the line 4 4, Fig. 2, the door of the trap being shown in closed position. Fig. 5 is a detail perspective view of the door.

Similar numerals of reference indicate corresponding parts throughout the figures.

Referring to the drawings, 1 designates the body of a trap, which may be of any approved shape and construction, and is provided with an opening 2 for the passage of the animals into the same.

Within the trap and extending from the opening 2 is an entrance-passage 3, which passage is composed of a series of inverted-U-shaped frames 4, arranged in alinement with each other and having their lower ends secured in the bottom of the trap, and disposed in said passage are the door 5 of the trap and the means for operating the same.

The door 5 comprises a U-shaped panel 6, the lower or outer end of which is hinged to the bottom of the trap near the opening 2 thereof, by staples 7, or their equivalents, and said staples straddle the cross-piece of the frame 6, thereby securely hinging the latter to said bottom, but permitting the same to be capable of a free vertical swinging movement. Each side of the frame 6, near the lower or outer end thereof, is provided with an offset 8, and secured to said sides is a tread-plate 9, which extends over the frame from the offsets 8 to approximately its inner end. The frame 6 has connected to its cross-piece spaced prongs 10, which are disposed beneath the plate 9, and said prongs lie parallel with and are of the same length as the sides of said frame, the inner ends of said prongs and sides being pointed, so as to prevent the animal in the body of the trap passing therefrom.

For operating the door 5 a tilting platform 11 is employed. This platform consists of a frame 12, which is covered by a plate 13, and from the outer end of the plate 13 the sides of the frame 12 are extended to form arms and lie along the outside of the frame 6 from the inner end thereof to the offsets 8, said sides of the frame 12 being looped around the offsets 8 and thereby providing a hinge connection between the tilting platform 11 and the door 5.

At a point intermediate the ends of the frame 12 and adjacent to the outer end of the plate 13 oppositely-disposed fulcrum-rods 14 are attached, said fulcrum-rods being connected at their upper ends to one of the frames 4 of the passage 3, and each having its lower end forming an eye 15, adapted to receive and hold the extended sides of the frame 12. The upper ends of the fulcrum-rods are provided with eyes which receive the transverse portion of one of the frames 4.

It is to be noted that the position of the door 5 is normally open, the inner end thereof resting upon the outer end of the plate 13 of the tilting platform 11, and in order that the plate 9 may lie substantially flush with the plate 13 the outer end of the latter is slightly depressed to receive the inner ends of the prongs 10 and the sides of the frame 6, and thereby present a comparatively smooth surface over which the animal may pass. Each edge of the tread-plate 9, adjacent to the fulcrum-rods 14, is notched, as at 16, so that when the door 5 is in open position said plate 9 may fit between said fulcrum-rods 14.

The operation and advantages of the herein-described trap will be readily understood by those skilled in the art.

As clearly shown in Fig. 2, the tilting platform 11 is slightly inclined upwardly when the door 5 is open, and the latter has its inner end resting upon the outer end of said platform. By reason of the rods 14 being connected to one of the frames 4 of the passage 3 it will be seen that the platform 11 is suspended, and the eyes 15 of said rods 14 form yielding fulcrum-points for the sides of said platform. When an animal passes over the door 5 and onto the plate 13 of the platform 11, the latter will descend by reason of the weight of the animal thereupon, and from the fact that the outer ends of the sides of the platform are looped around the offsets 8 the door 5 will be swung into its closed position. This results from the upward movement of the outer ends of the sides of the platform 11, which movement is caused by the descent of said platform, and the inner ends of the prongs 10 and the sides of the frame 6 are forced against the top of one of the frames of the passage 3, thereby closing the latter and preventing escape of the animal from the trap. While the animal remains upon the platform 11, it will be obvious that the door 5 remains closed, but immediately after said animal leaves the platform the door will descend and thus swing open, the platform 11 being elevated by the descent of the door. To effect this latter result, it will be necessary for the door to be of greater weight than the platform, so that the descent of the door will be positively insured, whereby the passage will be free for other animals to enter.

From the foregoing it will be apparent that I have provided a trap which is simple in construction; that the same is equally as well adapted for large animals as small ones, and also for fowls, it being understood that the material of which the trap is manufactured shall be suitable for the use to which it is to be applied; that an animal or fowl after passing into the trap shall be prevented escaping therefrom, even though the door of the same remains open while such animal or fowl is therein, and, finally, that by constructing the door of the trap as herein described the same shall remain in an open position except when the animal or fowl attempts to pass out therethrough, thereby affording a free passage to the interior of the trap and presenting an inducement for other animals or fowls to enter.

Having thus described the invention, what is claimed as new, and desired to be secured by Letters Patent, is—

1. In a trap, the combination of a body having an entrance-passage, an upwardly-swinging door hinged at its outer end and normally arranged at the bottom of the passage, a pair of rods depending within the passage at opposite sides thereof, and the platform arranged at the inner end of the door and provided at opposite sides thereof with outwardly-extending arms fulcrumed intermediate of their ends on the lower terminals of the depending rods and pivoted at their outer ends to the door at a point between the ends thereof, substantially as described.

2. In a trap, the combination, with the body thereof provided with an opening, of an entrance-passage arranged within said body and extending from said opening, a door disposed in said passage and adapted to close the same, said door comprising a U-shaped frame having offsets in the sides and provided with spaced prongs secured to the cross-piece of said U-shaped frame and lying parallel with the sides thereof, said door being also provided with a tread-plate secured on the U-shaped frame, and a tilting platform yieldingly fulcrumed within said passage, said platform comprising a frame covered by a plate and having its sides extended from the outer end of said plate and lying along the outside of the U-shaped frame of the door, said sides being looped around the offsets of the frame of the door and forming a hinged connection between the latter and the platform, whereby the door may be closed when said platform is operated by the animal or fowl within the trap, substantially as set forth.

3. In a trap, the combination, with the body thereof provided with an opening, of an entrance-passage arranged within said body and extending from said opening, said passage comprising a series of inverted-U-shaped frames arranged in alinement with each other and having their lower ends secured in the bottom of the trap, a door disposed in said passage and adapted to close the same, said door comprising a U-shaped frame having offsets in its sides and provided with spaced prongs secured to the cross-piece of said U-shaped frame and lying parallel with the sides thereof, the inner ends of said prongs and sides being pointed, said door being also provided with a tread-plate secured on the U-shaped frame, a tilting platform suspended within the passage, said platform comprising a frame covered by a plate and having its sides extended from the outer end of said plate and lying along the outside of the U-shaped frame of the door, said sides being looped around the offsets of the frame of the door and forming a hinge connection between the latter and the platform, whereby the door may be closed when said platform is operated by the animal or fowl within the trap, and fulcrum-rods connected at their upper ends to the top of the passage in the body of the trap and each having its lower end forming an eye adapted to receive and hold the extended sides of the platform-frame, said eyes forming yielding fulcrum-points for said extended sides, substantially as set forth.

4. In a trap, the combination of a body having an opening, an inwardly-extending passage located at the opening and comprising a series of inverted-U-shaped frames arranged in alinement and located at intervals, an upwardly-swinging door hinged at its outer end and normally arranged at the bottom of the passage, a pair of depending fulcrum-rods provided at their upper and lower ends with eyes, the upper eyes receiving the transverse portion of one of the U-shaped frames, and a platform arranged in rear of the door and provided at opposite sides of the same with arms passing through the lower eyes of the fulcrum-rods and pivotally connected with the door between the ends thereof, substantially as described.

In testimony that I claim the foregoing as my own I have hereto affixed my signature in the presence of two witnesses.

LLOYD FRANKLIN WILLIAMS.

Witnesses:
T. E. BANKS,
W. R. CATON.